(12) United States Patent
Gough et al.

(10) Patent No.: US 9,945,308 B2
(45) Date of Patent: Apr. 17, 2018

(54) AUTOMATIC CALIBRATION SYSTEM AND METHOD FOR A DUAL FUEL INTERNAL COMBUSTION ENGINE

(71) Applicant: Caterpillar Inc., Peoria, IL (US)

(72) Inventors: Michael D. Gough, Lafayette, IN (US); Nathan Atterberry, Washington, IL (US); Jeff Howard, Lafayette, IN (US); Brian Bell, West Lafayette, IN (US); Hua Xu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 45 days.

(21) Appl. No.: 15/263,945

(22) Filed: Sep. 13, 2016

(65) Prior Publication Data
US 2018/0073452 A1    Mar. 15, 2018

(51) Int. Cl.
| | |
|---|---|
| *F02D 41/40* | (2006.01) |
| *F02D 41/00* | (2006.01) |
| *F02D 41/14* | (2006.01) |
| *F02B 63/04* | (2006.01) |
| *F02B 37/00* | (2006.01) |
| *F02B 3/12* | (2006.01) |
| *F02D 41/38* | (2006.01) |

(52) U.S. Cl.
CPC ............ *F02D 41/0027* (2013.01); *F02B 3/12* (2013.01); *F02B 37/00* (2013.01); *F02B 63/04* (2013.01); *F02D 41/1446* (2013.01); *F02D 41/401* (2013.01); *F02D 2041/389* (2013.01); *F02D 2200/04* (2013.01)

(58) Field of Classification Search
CPC .... F02D 41/0085; F02D 41/402; F02D 41/40; F02D 41/30; F02D 41/04; F02D 41/1456; F02D 41/263; F02D 19/061; F02D 41/008; F02D 41/0082; F02D 41/1401; F02D 41/1441; F02D 41/222
See application file for complete search history.

(56) References Cited

U.S. PATENT DOCUMENTS

| | | | |
|---|---|---|---|
| 6,250,260 B1 | 6/2001 | Green | |
| 6,353,791 B1* | 3/2002 | Tuken | F02D 35/023 123/447 |
| 6,457,463 B1 | 10/2002 | McChesney et al. | |
| 6,863,034 B2 | 3/2005 | Kern et al. | |
| 7,401,606 B2* | 7/2008 | Lewis | B60W 10/06 123/179.18 |
| 7,559,309 B2* | 7/2009 | Winstead | F02D 35/0007 123/198 F |
| 7,996,147 B2 | 8/2011 | Gokhale | |
| 8,051,704 B2* | 11/2011 | Kim | G01M 15/00 73/114.49 |

(Continued)

FOREIGN PATENT DOCUMENTS

KR    10-2014-0127455 A    11/2014
WO    WO 2016/073588 A1    5/2016

*Primary Examiner* — Long T Tran

(57) ABSTRACT

A system and method for automatically calibrating an engine operating with a first fuel and a second fuel includes comparing each of a plurality of engine operating parameters with a corresponding limit, determining whether any of the plurality of engine operating parameters has exceeded its corresponding limit and, while none of the plurality of engine operating parameters has exceeded its corresponding limit, automatically and incrementally advance start of injection timing.

20 Claims, 5 Drawing Sheets

(56) References Cited

U.S. PATENT DOCUMENTS

| | | | | |
|---|---|---|---|---|
| 8,459,105 B2* | 6/2013 | Kim | ............ | G01M 15/00 |
| | | | | 73/114.49 |
| 8,756,986 B2* | 6/2014 | Jessen | ............ | F02D 41/0085 |
| | | | | 73/114.45 |
| 8,977,472 B2* | 3/2015 | Kita | ............ | F02D 41/32 |
| | | | | 701/104 |
| 9,108,632 B2* | 8/2015 | Gibson | ............ | B60W 20/10 |
| 9,174,633 B2* | 11/2015 | Lee | ............ | B60W 10/196 |
| 2011/0079197 A1 | 4/2011 | Stewart et al. | | |
| 2012/0210988 A1 | 8/2012 | Willi | | |
| 2014/0074380 A1 | 3/2014 | Fisher et al. | | |
| 2014/0309909 A1 | 10/2014 | McMahon | | |
| 2015/0219027 A1 | 8/2015 | zur Loye et al. | | |
| 2015/0344026 A1* | 12/2015 | Gibson | ............ | B60W 20/10 |
| | | | | 477/5 |

* cited by examiner

AUTOMATIC CALIBRATION SYSTEM AND METHOD FOR A DUAL FUEL INTERNAL COMBUSTION ENGINE

TECHNICAL FIELD

This patent disclosure relates generally to internal combustion engines and, more particularly, to engines configured to operate with more than one type of fuel such as diesel and natural gas.

BACKGROUND

Dual fuel engines are known for various applications, such as generator sets, engine-driven compressors, engine driven pumps, machine, off-highway trucks, marine applications and others. Typically, such engines are stationary and operate in the field. The operation of such engines by substitution of a certain amount of heavy fuel, such as diesel, with a lighter fuel, such as natural gas, biogas, liquid petroleum gas (LPG) or other types of fuel that may be more readily available and cost effective, makes them more effective to operate.

Nevertheless, it is often the case that the quality of the secondary fuel available in certain areas is not consistent. For example, when the secondary fuel is biogas generated onsite at an area, or even LPG or natural gas purchased from local sources, the fuel heating value and/or the methane number of these fuels is certain to vary over time or for different batches of fuel purchased. Such changes in the methane number or fuel heating value require various changes to the operation of the engine, such as diesel fuel injection amounts, injection timing, and the like, so that efficient engine is maintained.

Moreover, in typical dual fuel engine such as an engine operating to burn natural gas, the burning of which is initiated by a diesel pilot, significant time is spent in a laboratory to map out acceptable gas substitution rates across the operating range of the engine, while maintaining acceptable cylinder pressure, exhaust temperature and other engine operating parameters within hardware limits. Given the inherent variability in natural gas composition, these calibration techniques are often conservative and can lead to possible losses in relative to engine performance that can be achieved theoretically. All these and other factors add cost and complexity to the operation of an engine in the field.

SUMMARY

In one aspect, the disclosure describes a method for operating an engine. The method includes providing a first fuel into an engine cylinder, injecting a second fuel into the engine cylinder at a start of injection (SOI) timing, providing an engine parameter to a controller, providing a cylinder parameter to the controller, monitoring the engine parameter and the cylinder parameter with the controller, and comparing the engine parameter and the cylinder parameter in the controller with corresponding limits to determine a global error that is related to the engine parameter and a local error that is related to the cylinder. According to the method, while each of the global error and the local error indicate that the engine parameter and the cylinder parameter are below the corresponding limits, the SOI timing with the controller for all engine cylinders is automatically advanced. When the local error indicates that the cylinder parameter is above the corresponding limit, the SOI timing for a particular cylinder is automatically retarded with the controller.

In another aspect, the disclosure describes an engine having an engine cylinder for burning a mixture of a first fuel and a second fuel. The engine includes a first fuel system configured for providing the first fuel into the engine cylinder, a fuel injector configured for injecting the second fuel into the engine cylinder at a start of injection (SOI) timing, a first sensor operating to monitor a global engine parameter and to provide a first signal indicative of the global engine parameter, and a second sensor operating to monitor a cylinder-specific parameter of the engine cylinder and provide second signal indicative of a cylinder-specific engine parameter. A controller is disposed to receive the first signal and the second signal and operates to monitoring the global engine parameter and the cylinder-specific engine parameter. The controller is configured to compare the global engine parameter with a corresponding limit to determine a global error, and also compare the cylinder-specific parameter with a corresponding limit to determine a local error. While the global error indicates that the engine parameter is below its corresponding limit, and also while the local error indicates that the cylinder-specific parameter is below its corresponding limit, the SOI timing is automatically advanced with the controller for all engine cylinders. While the local error indicates that the cylinder-specific parameter is above its corresponding limit, the SOI timing for the particular engine cylinder is automatically retarded with the controller.

In yet another aspect, the disclosure describes a method for automatically calibrating an engine operating with a first fuel and a second fuel. The method includes comparing each of a plurality of global and local engine operating parameters with corresponding limits, determining whether any of the plurality of global and local engine operating parameters has exceeded its corresponding limit. During operation, while none of the plurality of global and local engine operating parameters has exceeded its corresponding limit, start of injection (SOI) timing for all engine cylinders is automatically and incrementally advanced. In the event that at least one of the local engine operating parameters exceeds its corresponding limit, the start of injection timing for one of the engine cylinders at which the local engine operating parameter corresponds is retarded.

Figure 2:
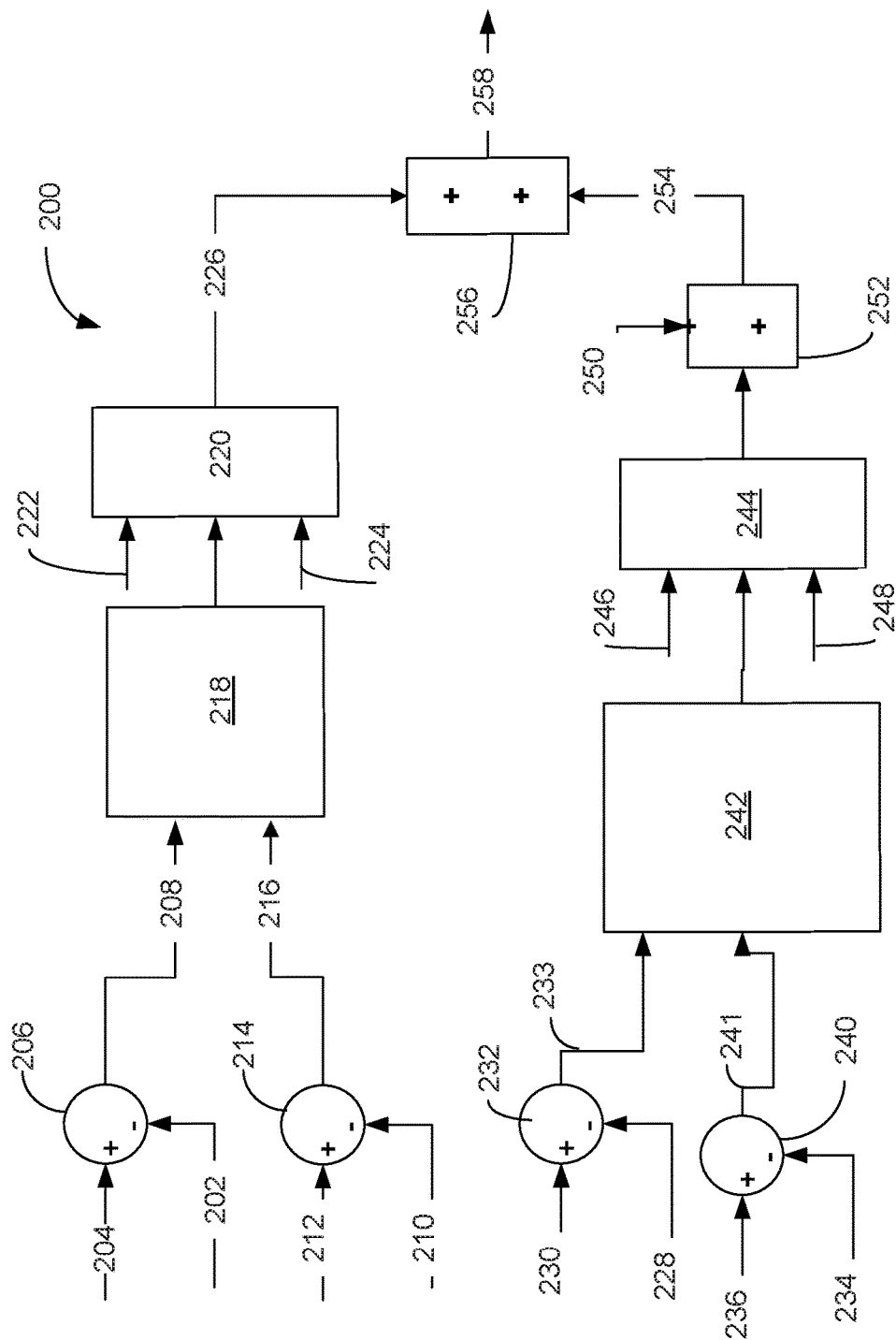
Figure 3:
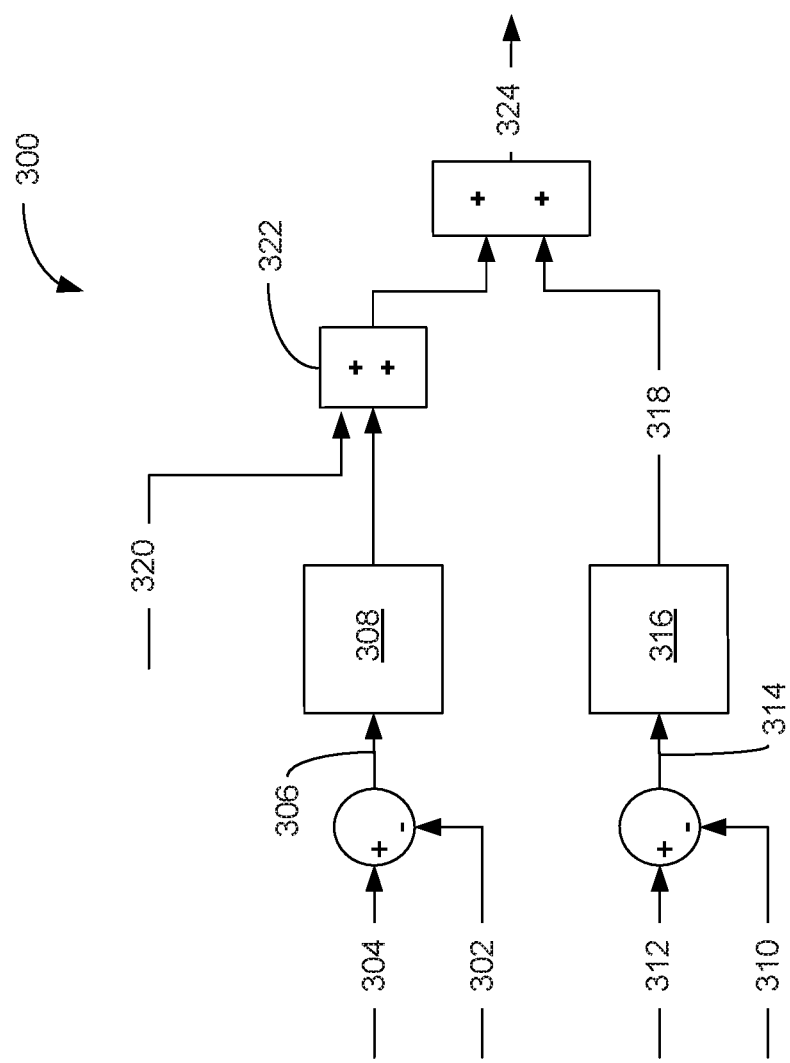
Figure 4:
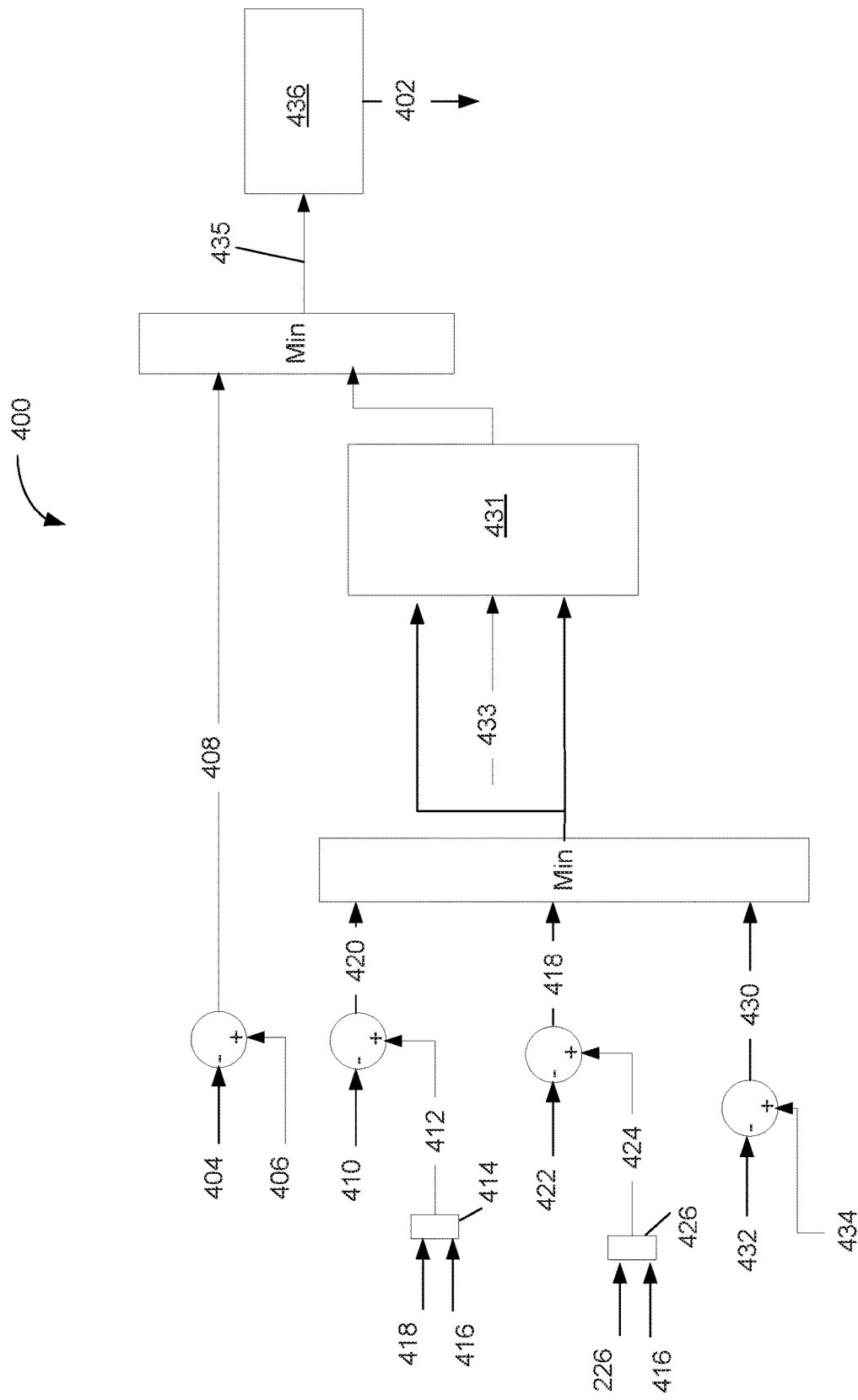

Each of FIGS. 2-4 is a block diagram of a fuel substitution controller in accordance with the disclosure.

Figure 5:
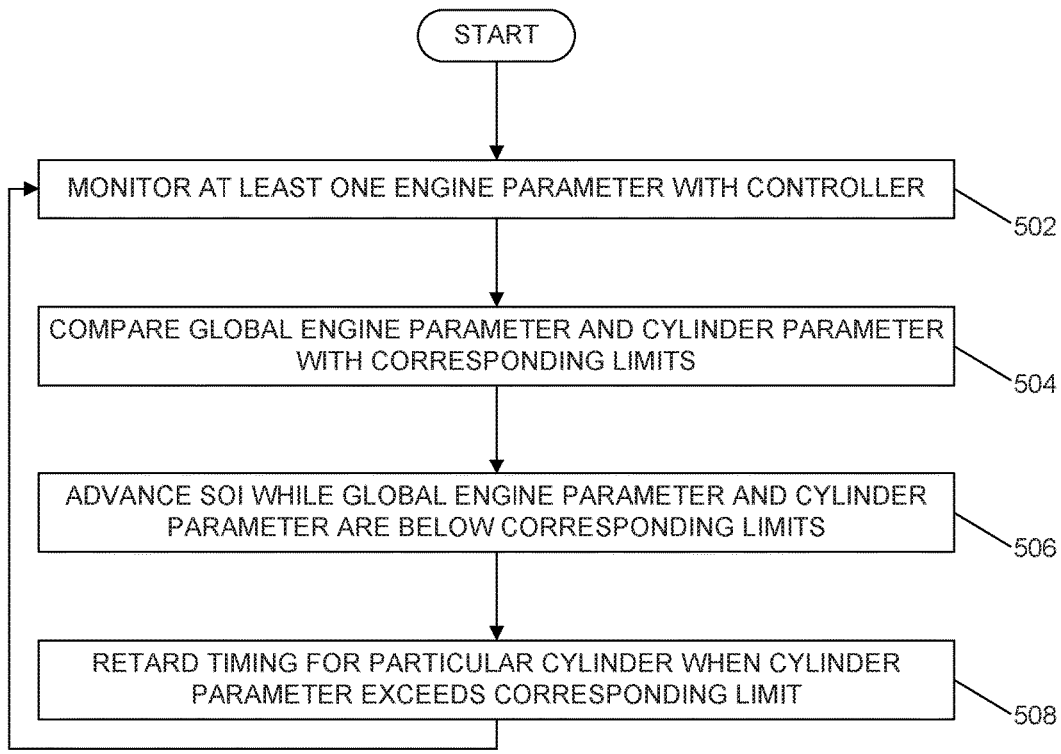

FIG. 5 is a flowchart for a method of operating an internal combustion engine having dual fuel capability in accordance with the disclosure.

DETAILED DESCRIPTION

Figure 1:
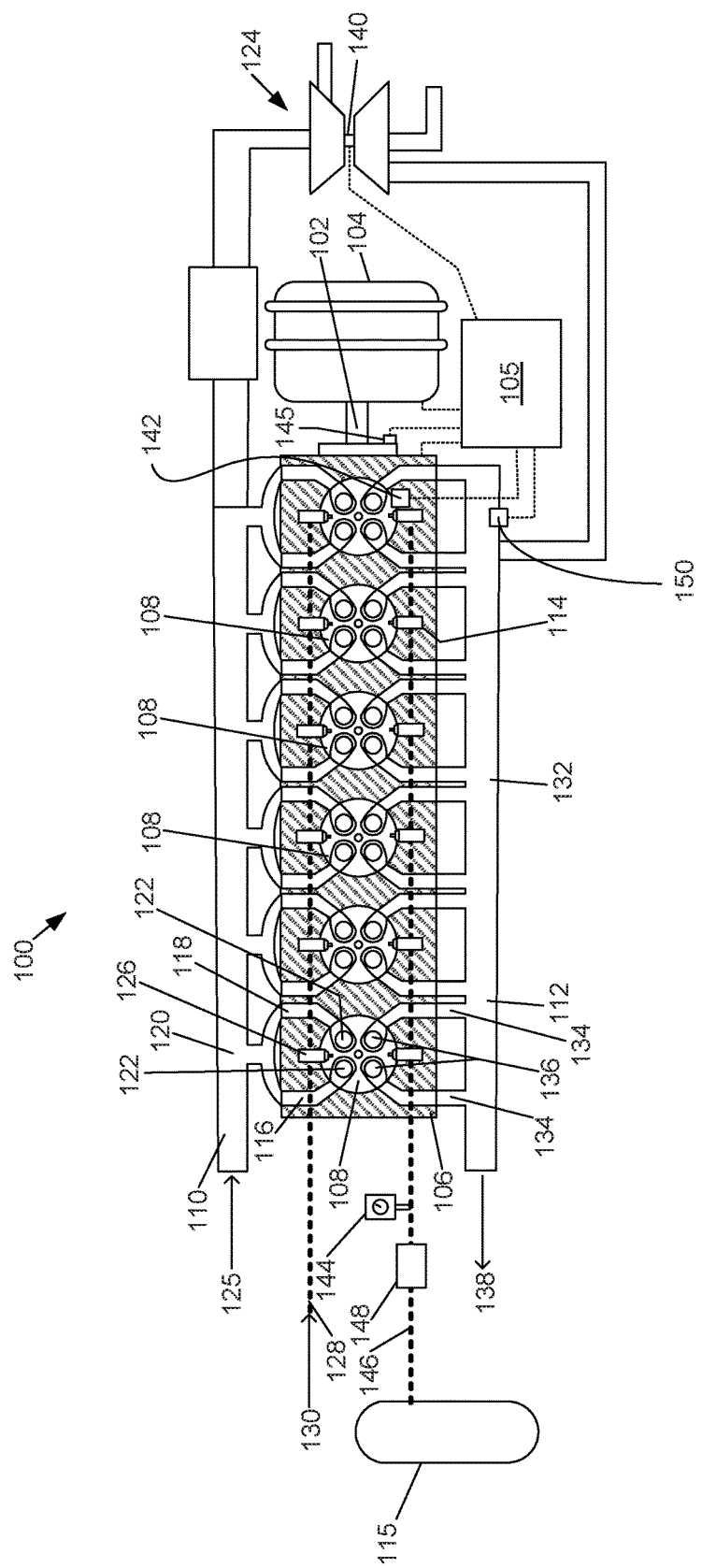
FIG. 1 is a block diagram of an internal combustion engine configured to operate using two fuel supplies in accordance with the disclosure.

FIG. 1 is a block diagram representation of an internal combustion engine 100 in accordance with the disclosure. As shown, the engine 100 is an engine configured to propel a hybrid-electric machine and is part of a generator set that produces electrical power to drive electric motors that propel a machine, locomotive and the like. Alternatively, the engine 100 may be part of a machine or off-highway truck and be directly connected to a fluid pump that is part of a hydrostatic drive system, mechanical drive arrangement and the like, or any other engine-driven application such as an engine-driven pump, generator, transmission and the like.

The engine 100 has an output shaft 102 connected to a system that is driven by the engine such as a generator 104 or any other system. During operation, the engine 100 may operate at a nearly constant engine speed but at a varying load depending on the electrical power or current output of the generator 104. It should be appreciated that, in general, the engine may often operate at different engine speeds and loads depending on the speed and payload of the machine. A controller 105 may be operably associated with various engine and/or generator systems. The controller 105 in the illustrated embodiment includes operable connections to various sensors and systems of the engine 100 and generator 104, and is configured to receive information on the operating parameters thereof as well as send commands to various actuators and systems through the connections.

The controller 105 may be a single controller or may include more than one controller disposed to control various functions and/or features of the system. For example, a master controller, used to control the overall operation and function of the generator set may be cooperatively implemented with an engine controller used to control the engine 100. In this embodiment, the term "controller" is meant to include one, two, or more controllers that may be associated with the engine 100 and that may cooperate in controlling various functions and operations of the engine 100 and generator 104. The functionality of the controller 105, while shown conceptually in FIG. 2 to include various discrete functions for illustrative purposes only, may be implemented in hardware and/or software without regard to the discrete functionality shown. Accordingly, various interfaces of the controller are described relative to components of the generator set shown in the block diagram of FIG. 2. Such interfaces are not intended to limit the type and number of components that are connected, nor the number of controllers that are described.

Accordingly, the controller 105 in the illustrated embodiment is configured to receive information indicative of various operating parameters of the engine 100 and to control various operating parameters of the engine 100, such as fuel injection timing, allowable or desired fuel substitution rates depending on the operating point of the engine 100, and others. The engine 100 may include various components and systems, such as lubrication and electrical systems, which have been omitted from FIG. 1 for simplicity. Relevant to the present disclosure, the engine 100 includes a crankcase 106 having one or more combustion cylinders 108 formed therein. Although six cylinders 108 are shown in an inline configuration, any other number of cylinders arranged in different configurations, such as a "V" configuration, may be used.

Each cylinder 108 includes a reciprocable piston defining a combustion chamber that is connectable to an intake manifold 110 and an exhaust manifold 112. A turbocharger 124 is connected between the exhaust and intake manifolds 112 and 110 in the known fashion. While a turbocharger is shown in the illustrated embodiment, the systems and methods in accordance with the present disclosure can be used on any type of machine. Each cylinder 108 includes a direct-injection diesel injector 126. The diesel injectors 126 are connected to a source of pressurized diesel fuel, which provides fuel to each injector 126 via a diesel fuel line 128. Each injector 126 is configured to inject a predetermined amount of diesel fuel 130 into each cylinder 108 in response to an appropriate command from the controller 105 during engine operation. For example, the controller 105 may be configured to receive timing information from the engine 100, which is used to determine the appropriate injection timing for each combustion cylinder 108.

In the present disclosure, the particular amount of diesel fuel 130 that may be provided to each cylinder during operation may be dynamically adjusted continuously during engine operation based on various engine operating parameters. In a self-calibrating or automatically calibrating process, the controller 105 is permitted to self calibrate such that it operates various engine valves and systems to achieve a maximum possible operating efficiency for the engine, for example, add a maximum amount of gas possible, or other parameters while staying away from hardware limits. When a hardware limit is approached, the system automatically adjusts the calibration to keep competing hardware limits in acceptable ranges. The system, which is described in further detail hereinafter, may use some of or all of the following inputs: Turbine inlet temperature, Turbocharger speed, Peak cylinder pressure (per cylinder), Indicated mean effective pressure (per cylinder), 50% burn crank angle position (per cylinder), Cylinder detonation (per cylinder), Exhaust port temperature (per cylinder or globally for the entire engine), and other parameters. The control system operating within the controller 105 in this respect is programmed to operate or configured to react to the parameters listed above, and perform various calibration adjustments to engine operation automatically. The various calibration parameters that may be adjusted in this fashion include Diesel injection timing (per cylinder control), Diesel injection quantity (per cylinder control), Gas quantity Adjustment based on the number of cylinders that are active, and other adjustments. By adjusting these parameters, the engine can operate with all the engine cylinders being near their respective hardware limits without being limited by a relatively higher peak cylinder pressure in any one of the cylinders. Adjusting these parameters also allows the engine to operate closer to its mechanical limits than was possible in the past. For example, in the past, at some operating conditions the engine would operate at its peak cylinder pressure limit which reduced gas substitution. With a self-calibrating or dynamically-calibrating system in accordance with the present disclosure, when a peak cylinder pressure limit is reached while turbo speed and turbine inlet temperature limits have not yet been reached, timing can be retarded on a global scale (i.e., for all engine cylinders) to lower peak cylinder pressure while still staying within turbo speed and turbine inlet temperature limits.

Accordingly, the engine 100 is configured to operate with a second fuel, in this case natural gas, and thus further includes a secondary fuel injector 114 at each cylinder 108 that is disposed to inject fuel directly into each cylinder. In an alternate embodiment, a single secondary fuel injector 114 may provide the gaseous fuel into the intake manifold 110, which will then distribute the fuel to all active cylinders in the engine. The secondary fuel injectors 114 are gas fuel injectors 114 that are operably connected to a supply of gaseous fuel or reservoir 115, which may be a tank reservoir or may alternatively be a pressure regulated supply from a field source, such as biogas from a land fill, natural gas from an oil well and the like. The gas fuel injectors 114 operate to deliver a predetermined amount of gaseous or another secondary fuel into the engine cylinders 108. The fuel delivered mixes with incoming air 125 to form an air/fuel mixture that is enclosed into the cylinders 108. Air is provided via intake valves 122.

During operation, an air/fuel mixture is compressed into each cylinder 108. Diesel fuel is injected into each cylinder 108 at the appropriate time and duration during engine operation to provide a richer air/fuel mixture than what is already present in the cylinder 108. Compression of this mixture within the cylinder 108 causes auto-ignition of the diesel fuel found therein, which initiates burning of all combustible fuels found the in the cylinder. This includes the diesel fuel as well as the secondary fuel that was previously delivered by the secondary fuel injector 114.

The auto-ignition of diesel fuel provided by each injector 126 causes the combustion of an air/fuel mixture present in a compressed state in each cylinder 108. Each cylinder 108 is configured to selectively receive air from the intake manifold 110, which may be at or below atmospheric pressure for a naturally aspirated engine, or may alternatively be under positive gage pressure in a turbocharged or supercharged engine.

During operation, air from the intake manifold 110 is provided to each cylinder 108 via, respectively, first and second intake ports 116 and 118. The first and second intake ports 116 and 118 of each cylinder 108 may be directly connected to an intake plenum volume 120 of the intake manifold 110 or may alternatively be branches of a combined intake port (not shown) that is fluidly open to the intake plenum volume 120. A first intake valve 122 is disposed to fluidly isolate the cylinder 108 from the first intake port 116, and a second intake valve 122 is similarly disposed to fluidly isolate the cylinder 108 from the second intake port 118. When the first and second intake valves 122 are closed, such as during combustion of the air/fuel mixture in the cylinder 108, fluid communication between each respective cylinder 108 and the intake manifold 110 is blocked. Similarly, at least partial opening of either the first and/or second intake valve(s) 122 permits the fluid communication of the cylinder 108 with the intake plenum volume 120 such that air 125 may enter the cylinder 108. The combustion of the air/fuel mixture in the cylinder 108 produces power, which is transferred as torque to the output shaft 102 to drive the generator 104. The generator 104 is configured to provide electrical power through an output node. Exhaust gas remaining after the combustion of fuel from each injector 126 with air from the first and second intake ports 122 within each cylinder 108 is evacuated and collected in the exhaust manifold 112. In the illustrated embodiment, each cylinder 108 is fluidly connectable to an exhaust plenum volume 132 via two exhaust ports 134. Each exhaust port 134 is fluidly isolatable from the cylinder 108 by a corresponding exhaust valve 136. The exhaust gas 138 collected is removed from the exhaust manifold 112. Although two exhaust valves 136 are shown corresponding to each cylinder 108, a single exhaust valve disposed in a single exhaust port per cylinder 108, or more than two valves may be used depending on engine configuration.

The engine 100 and related generator 104 system includes various sensors that are relevant to the present disclosure. More particularly, a turbocharger speed sensor 140, which is generically illustrated in FIG. 1, is associated with the turbocharger 124 and configured to measure a parameter indicative of a rotating speed of a turbocharger shaft. Signals indicative of the turbocharger speed measured by the sensor 140 are provided to the controller 105. A cylinder pressure sensor 142 may be associated with each cylinder 108 (one shown) and may provide to the controller signals indicative of cylinder pressure within each cylinder 108 during operation such that the controller 105 can infer, estimate or calculate the timing and characteristics of fuel/air burning within each cylinder. An exhaust temperature sensor 150 may be associated with each cylinder 108 (only one shown) and provide to the controller a temperature signal indicative of the temperature of exhaust gas provided by each cylinder 108. Additional sensors may be used, such as airflow, air pressure and/or oxygen concentration sensors (not shown) configured to measure parameters of the incoming airflow 125. In the illustrated embodiment, an engine speed sensor 145 is connected to the controller 105 and configured to provide a signal indicative of the instantaneous crankshaft (or camshaft) angle of the engine during operation, for example, as measured at a timing disk connected to the shaft 102 or another appropriate location.

A secondary fuel sensor 144, for example, a pressure sensor, is associated with a secondary fuel supply line 146 at a location downstream from a secondary fuel flow control valve 148. In an embodiment where the secondary fuel is a gas as shown, for example, in FIG. 1, the control valve 148 may be operably associated with the controller 105 and configured to meter the flow of fuel from the reservoir 115 to the injector 114 in response to appropriate signals from the electronic controller 105. The secondary fuel flow sensor 144 may be located anywhere along the fuel line 146. In the illustrated embodiment, the fuel flow sensor 144 is located downstream of the control valve 148. The secondary fuel flow sensor 144 may be any appropriate type of digital or analog output sensor that is configured to provide a signal to the electronic controller 105 that is indicative of the mass flow or volume flow rate of gaseous fluid passing through the injector 114 during engine operation.

A block diagram for a controller 200 is shown in FIG. 2. The controller 200 may be part of a larger control scheme for controlling and monitoring the operation of the engine 100 (FIG. 1). The controller 200 may be further integrated with and be operating within the electronic controller 105 (FIG. 1) such that inputs and outputs of the controller 200 are signals present within the electronic controller 105.

The controller 200 operates to provide a start of injection (SOI) command or signal to each of the diesel fuel injectors 126 (FIG. 1) that will provide a desired engine timing. As discussed above, the SOI command is not only pre-determined from a base calibration, but is also dynamically adjusted during engine operation to ensure that the engine operates at a desired efficiency while still observing desired mechanical and other operating limits of the various engine components and systems. In the embodiment shown, the controller 200 is a high level controller that adjusts a main or base injection timing value based on conditions within each engine cylinder as well as conditions of the overall operation of the engine.

In one contemplated embodiment, the controller 200 operates to effect global adjustments (i.e., for all engine cylinders or for the entire engine) in various engine operating parameters such as start of injection (SOI), as well as other engine parameters, for example, the rate of exhaust gas recirculation (EGR), fuel rail pressures, air to fuel ratio, and the like. The global adjustments are made on the basis of global engine operating parameters such as turbocharger speed, exhaust gas temperature, and the like. At the same time, the controller 200 also operates to effect local adjustments (i.e., on a per-cylinder basis), which are carried out at a faster rate than the global adjustments. The local adjustments are performed based on local parameters such as parameters directly or indirectly related to cylinder pressure, and are performed on a per-cylinder basis to change an engine operating parameter such as SOI for each particular cylinder, as needed.

More specifically, the controller 200 receives as inputs a peak cylinder pressure value (PCP) 202 for each of the cylinders of the engine. For example, for the engine 100 shown in FIG. 1 that has 8 cylinders, the controller would operate based on and track 8 different PCPs based on information provided by eight different cylinder pressure sensors, each of which is associated with a respective one of the engine cylinders. Each PCP 202 is compared to a PCP limit 204, which represents the peak cylinder pressure limit for the engine's cylinders, at a comparator 206 that provides a PCP error 208. This calculation is carried out for each engine cylinder separately such that there are as many PCP errors 208 calculated as there are engine cylinders, each error being calculated on the basis of cylinder pressure readings acquired from each particular cylinder. In the illustrated embodiment, only one PCP error 208 calculation is shown for simplicity, but it should be appreciated that the calculations shown would be duplicated for each additional cylinder on the engine. The PCP error 208 is expected to be a positive value indicating the cushion or margin in terms of cylinder pressure at which each engine cylinder is operating. In a similar fashion, a detonation pressure value 210 is compared with a detonation pressure limit 212 at a comparator 214 to provide a detonation pressure error 216, which is indicative of the relative cushion within each engine cylinder of detonation pressure at the initiation of combustion with respect to the mechanical limits of the various engine components that are associated with the engine cylinders. In alternative embodiments, additional or different cylinder-specific or local engine parameters can be used such as IMEWP, MBF50, and the like.

The PCP error 208 and detonation error 216 for each engine cylinder are provided to a first timing adjustment function 218, which operates to incrementally adjust engine timing, i.e., advance or retard SOI, depending on the state of the PCP and detonation errors 208 and 216 at a per-cylinder basis and for each particular cylinder of the engine. Specifically, when both the PCP and detonation errors 208 and 216 for any particular engine cylinder are both positive, indicating that the particular cylinder is operating within its respective cushion and the respective PCP and detonation limits have not been exceeded, the timing is incrementally advanced for that cylinder incrementally. The same process is simultaneously carried out for the remaining engine cylinders. When either the PCP error 208 or the detonation error 216 becomes negative, indicating that a respective limit has been exceeded at a particular cylinder, and while the global engine parameters being monitored such as engine exhaust temperature and turbocharger speed are below their corresponding limits, then the timing for that cylinder is retarded incrementally until the errors are once again both positive. This adjustment is carried out continuously during engine operation. A saturation function 220 having an upper limit 222 and a lower limit 224 is applied to the output of the first timing adjustment function 218 to provide a first buffered adjustment signal 226 that represents an incremental change in timing provided by the first timing adjustment function 218. It is noted that a time constant or magnitude of the timing adjustment in this part of the controller 200 is configured to provide relatively fast adjustments to the SOT.

In a similar fashion, the controller 200 performs a global adjustment. To that end, the controller 200 receives a turbocharger speed signal 228 that is compared to a turbocharger speed limit 230 at a comparator 232 to provide a speed error 233. At the same time, an exhaust temperature 234 of the engine overall is compared with an exhaust temperature limit 236 at a comparator 240 to provide a temperature error 241. The speed and temperature errors 233 and 241 are provided to a second timing adjustment function 242, which is configured and operates to advance timing when both errors are positive and errors 208 and 216 are positive, indicating that the turbocharger speed and exhaust temperatures of the engine are below their respective limits. When the speed error 233 or the temperature error 241 becomes negative, indicating that a respective limit has been crossed, the second timing adjustment function 242 operates to advance timing while errors 208 and 216 remain positive, which indicates that there is sufficient margin in terms of peak cylinder pressure and detonation pressure. When the speed error 233 is at zero, indicating that the turbocharger is operating at its speed limit, the timing is not adjusted.

The output of the second timing adjustment function 242 is provided to a saturation function 244 that has an upper limit 246 and a lower limit 248. The buffered output of the saturation function 244, which represents a timing change, is added to a base timing value 250 at an adder 252 to produce a desired timing adjustment 254, which is applied globally to all the engine cylinders, and to which the first buffered adjustment signal 226 is added at an adder 256 to provide a compensated timing command 258 for each particular cylinder. The compensated timing command 258 is provided to other controllers of the engine to effect a change in SOI, which is applied to all engine cylinders of the engine.

The controller 200 may be implemented with various refinements and/or alternative implementations. One alternative embodiment is shown in FIG. 3. In this embodiment, a controller 300 compares the exhaust temperature 302 with a desired exhaust temperature 304 to produce a temperature error 306, which as before indicates the cushion in terms of temperature and which drives a global adjustment of SOI for all engine cylinders. The temperature error is provided to a first timing adjustment function 308 that operates to advance timing while the temperature error is negative. The controller also compares a ratio 310 of PCP with ripple, knock or detonation pressure for each individual engine cylinder, which indicates burning in the cylinder, with a desired ratio 312 to generate a ratio error 314 for each engine cylinder. The ratio errors 314 are provided to respective integral controllers 316, each of which provides a ratio adjustment term 318 that is applied to the respective engine cylinder. When the temperature error 306 and all of the ratio errors 314 becomes positive, the first timing adjustment function 308 still advances timing, but retards timing when the temperature ratio is positive but any of the ratio errors 314 becomes negative, and freezes timing when the temperature error 306 becomes zero, i.e., the engine is operating at the exhaust temperature limit. The output of the first timing adjustment function 308 is added to a base timing 320 at an adder 322, to which the ratio adjustment term 318 is also added to provide a SOI command 324. When comparing operation of the controller 300 to that of controller 200, one can appreciate that the controller 300 may still advance timing even when the exhaust temperature limit has been exceeded while the ratio of PCP to ripple within the cylinder, which indicates a consistency of combustion, is still within limits.

During operation, the gas substitution can also be maximized by being increased as long as a limit on gas substitution, or gas factor, has not been reached. A controller 400 for determining a gas limit factor 402 is shown in FIG. 4. The controller 400 monitors a gas fuel valve position 404 and compares it with a maximum position 406 to provide a valve position difference 408. At the same time, the controller compares a PCP 410 with a PCP limit 412, which is established based on a map 414 into which the then present gas substitution rate 416 and power fraction 418 or engine power, to provide a PCP error 420. The controller also compares a ripple 422 with a ripple limit 424, which is established based on a map 426 into which the then present gas substitution rate 416 and power fraction 418 or engine power, to provide a ripple error 428. A temperature error 430 is provided when the exhaust temperature 432 is compared with a temperature limit 434.

A function selects the lesser of the PCP error 420, the ripple error 428 and the temperature error 430, which indicates which operating parameter operates closest to its respective limit, and activates a switch 431 to pass through the lesser of 420, 428 and 430 to gas limit 433 when the SOI timing adjustment is stopped. While SOI is being adjusted, the switch 431 is activated to pass through a non-negative value as the gas limit 433, which is provided to a controller operating to increase a gas limit of the engine such that a maximum amount of gas substitution is increased for the engine until a limit is reached, as described above. It is noted that, while various parameters are discussed herein with respect to monitoring individual cylinders, these parameters may also be considered in the aggregate for all cylinders together, for example, by incorporating a single sensor or, in the case of cylinder-specific parameters such as PCP or ripple, by calculating a weighted, moving average for all engine cylinders.

INDUSTRIAL APPLICABILITY

This disclosure generally relates to dual fuel internal combustion engines. The embodiments described herein specifically relative to engines operating on natural gas, liquefied petroleum gas (LPG), biogas, or any other combustible fuel, and connected to electrical generators for the generation of electrical power, but any other type of engine may be used. Additional application examples contemplated are engines that are used to drive machines and/or other off-highway trucks that are connected to generators that are part of hybrid-electric drive systems, fluid pumps that are part of hydrostatic drive systems, and the like. Accordingly, the systems and methods disclosed herein are applicable to engines installed in large equipment, such as locomotive or marine applications, as well as engines installed in vehicles, such as in the trucking or automotive industries.

A flowchart for a method of operating a dual fuel engine and, specifically, a gaseous fuel engine using an injection of diesel to initiate burning within each engine cylinder, is shown in FIG. 5. In accordance with the method, at least one engine parameter is monitored with an engine controller at 502. Using the controller, a global engine parameter such as turbocharger speed, exhaust temperature and the like is/are compared with corresponding limit(s). At the same time, a parameter specific to a particular engine cylinder, or a local engine parameter, such as peak cylinder pressure, combustion pressure and the like, is compared with a corresponding limit. This is carried out independently for each of a plurality of engine cylinders. The controller then compares the global engine parameter and the local engine parameter or cylinder parameter with their corresponding limits at 504. While the global engine parameter and all local engine parameters are below their corresponding limits, the SOI for all engine cylinders is advanced at 506, in an incremental fashion and as required. When a particular local engine parameter exceeds its limit, and while the global engine parameters are still below their limits, the SOI for the particular cylinder corresponding to the local engine parameter that exceeded its limit is retarded at 508. This process continues while the engine operating such that the engine timing is continually monitored for adjustment while the engine operates.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The invention claimed is:

1. A method for operating an engine, comprising:
providing a first fuel into an engine cylinder;
injecting a second fuel into the engine cylinder at a start of injection (SOI) timing;
providing an engine parameter to a controller;
providing a cylinder parameter to the controller;
monitoring the engine parameter and the cylinder parameter with the controller;
comparing the engine parameter and the cylinder parameter in the controller with corresponding limits to determine a global error that is related to the engine parameter and a local error that is related to the cylinder; and
while each of the global error and the local error indicate that the engine parameter and the cylinder parameter are below the corresponding limits, automatically advancing the SOI timing with the controller for all engine cylinders,
when the local error indicates that the cylinder parameter is above the corresponding limit, automatically retarding the SOI timing for a particular cylinder with the controller.

2. The method of claim 1, wherein the first fuel is a gaseous fuel and the second fuel is diesel fuel, and wherein the method further comprises injecting the diesel fuel directly into an engine cylinder using a diesel fuel injector.

3. The method of claim 1, wherein the engine parameter is provided from a sensor disposed to measure the engine parameter and provide a signal indicative of the engine parameter to the controller.

4. The method of claim 3, wherein the engine parameter is at least one of a turbocharger speed and an exhaust temperature.

5. The method of claim 4, further comprising:
monitoring a second engine parameter with the controller;
comparing the second engine parameter in the controller with a second limit to determine a second error;
while the error indicates that the engine parameter is below the corresponding limit, and the second error indicates that the second engine parameter is below the second limit, automatically advancing the SOI timing with the controller, and
when one of the error and the second error indicates that the engine parameter is above the corresponding limit or the second parameter is above the second limit, automatically retarding the SOI timing with the controller.

6. The method of claim 1, further comprising calculating an adjustment value in the controller based on the error.

7. The method of claim 6, further comprising adding the adjustment value to a base timing value to calculate a final timing command in the controller, the final timing command determining the SOI timing for the second fuel.

8. The method of claim 1, wherein and wherein the cylinder parameter is at least one of a cylinder pressure and a detonation value.

9. The method of claim 1, wherein the engine parameter is a fuel valve position for a fuel valve controlling a flow of the first fuel to the engine, and wherein the method further comprises:
determining a second limit for a second engine parameter based on then-present engine operating conditions;
comparing the second limit with the second engine parameter to determine a second error; and
setting a limit for the amount of second fuel that can be provided to the engine based on the error and the second error.

10. An engine having an engine cylinder for burning a mixture of a first fuel and a second fuel, comprising:
a first fuel system configured for providing the first fuel into the engine cylinder;
a fuel injector configured for injecting the second fuel into the engine cylinder at a start of injection (SOI) timing;
a first sensor operating to monitor a global engine parameter and to provide a first signal indicative of the global engine parameter;
a second sensor operating to monitor a cylinder-specific parameter of the engine cylinder and provide second signal indicative of a cylinder-specific engine parameter;
a controller disposed to receive the first signal and the second signal and operating to monitoring the global engine parameter and the cylinder-specific engine parameter;
wherein the controller is configured to:
compare the global engine parameter with a corresponding limit to determine a global error;
compare the cylinder-specific parameter with a corresponding limit to determine a local error; and
while the global error indicates that the engine parameter and the local error indicates that the cylinder-specific parameter are below their corresponding limits, automatically advance the SOI timing with the controller for all engine cylinders, and
while the local error indicates that the cylinder-specific parameter is above the corresponding limit, automatically retard the SOI timing for the particular engine cylinder with the controller.

11. The engine of claim 10, wherein the first fuel is a gaseous fuel and the second fuel is diesel fuel, and wherein the fuel injector is configured to inject the diesel fuel directly into the engine cylinder.

12. The engine of claim 10, wherein the global engine parameter is at least one of a turbocharger speed and an exhaust temperature, and wherein the cylinder-specific parameter is at least one of a peak cylinder pressure and a detonation value.

13. The engine of claim 12, wherein the engine includes a plurality of engine cylinder, wherein the controller is further configured to determine a plurality of local errors, each of the plurality of local errors corresponding to one of the plurality of engine cylinders, and wherein when one of the plurality of local errors exceeds its corresponding limit, the controller operates to automatically retard the SOI for the corresponding engine cylinder independently from the remaining engine cylinders in the plurality of engine cylinders.

14. The engine of claim 10, wherein the controller is further configured to calculate an adjustment value for the SOI timing based on the global error or the local error.

15. The engine of claim 14, wherein the controller is further configured to add the adjustment value to a base timing value to calculate a final timing command, the final timing command determining the SOI timing for the second fuel.

16. The engine of claim 10, wherein the engine parameter is a fuel valve position for a fuel valve controlling a flow of the first fuel to the engine, and wherein the controller is further configured to:
determine a second limit for a second engine parameter based on then-present engine operating conditions;
compare the second limit with the second engine parameter to determine a second error; and
set a limit for the amount of second fuel that can be provided to the engine based on the error and the second error.

17. The engine of claim 10, further comprising a gaseous fuel injector associated with the engine cylinder and disposed to inject the first fuel directly into the first cylinder.

18. A method for automatically calibrating an engine operating with a first fuel and a second fuel, the method comprising:
comparing each of a plurality of global and local engine operating parameters with corresponding limits;
determining whether any of the plurality of global and local engine operating parameters has exceeded its corresponding limit;
while none of the plurality of global and local engine operating parameters has exceeded its corresponding limit, automatically and incrementally advance start of injection (SOI) timing for all engine cylinders; and
in the event at least one of the local engine operating parameters exceeds its corresponding limit, retarding the start of injection timing for one of the engine cylinders at which the local engine operating parameter corresponds.

19. The method of claim 18, wherein the plurality of engine operating parameters includes a peak cylinder pressure, a detonation value, a turbocharger speed and an exhaust temperature.

20. The method of claim 19, wherein the plurality of engine parameters includes global engine parameters, which global engine parameters are affected by operation of a plurality of engine cylinders, and local engine parameters, which local engine parameters are affected by operation of a particular engine cylinder from the plurality of engine cylinders, and wherein the method further includes adjusting SOI for all of the plurality of engine cylinders based on the global engine parameters and adjusting SOI for particular engine cylinders independently from the remaining engine cylinders in the plurality of engine cylinders based on local engine parameters.

* * * * *